United States Patent [19]
Lewis

[11] 3,938,154
[45] Feb. 10, 1976

[54] MODIFIED SIDELOBE CANCELLER SYSTEM

[75] Inventor: Bernard L. Lewis, Oxon Hill, Md.

[73] Assignee: The United States of America as represented by the Secretary of the Navy, Washington, D.C.

[22] Filed: Aug. 16, 1974

[21] Appl. No.: 499,374

[52] U.S. Cl. .................... 343/100 LE; 343/100 CL
[51] Int. Cl.² .......................................... H04B 7/00
[58] Field of Search ............... 343/100 LE, 100 CL; 325/323, 371; 340/15.5 CC, 15.5 SC

[56] References Cited
UNITED STATES PATENTS

3,202,990  4/1965  Howells ........................ 343/100 LE

*Primary Examiner*—Maynard R. Wilbur
*Assistant Examiner*—T. M. Blum
*Attorney, Agent, or Firm*—R. S. Sciascia; Arthur L. Branning; George A. Montanye

[57] ABSTRACT

An improved technique for eliminating interference in a signal processing system exposed to multiple interference sources. A main receiving channel output and a plurality of auxiliary channel outputs are connected to form a canceller system where outputs from the canceller of each auxiliary channel are connected in parallel and subtracted from the main channel signal. The output residue from the subtractor is then combined in a second subtractor with the input from a second group of parallel connected cancellers using the same auxiliary channels. Each group of parallel connected cancellers and subtractor forms an iteration which reduces the residue of interference in the main channel. By providing a series of iterations, the cancellation obtainable can be improved along with an increase in system stability.

5 Claims, 3 Drawing Figures

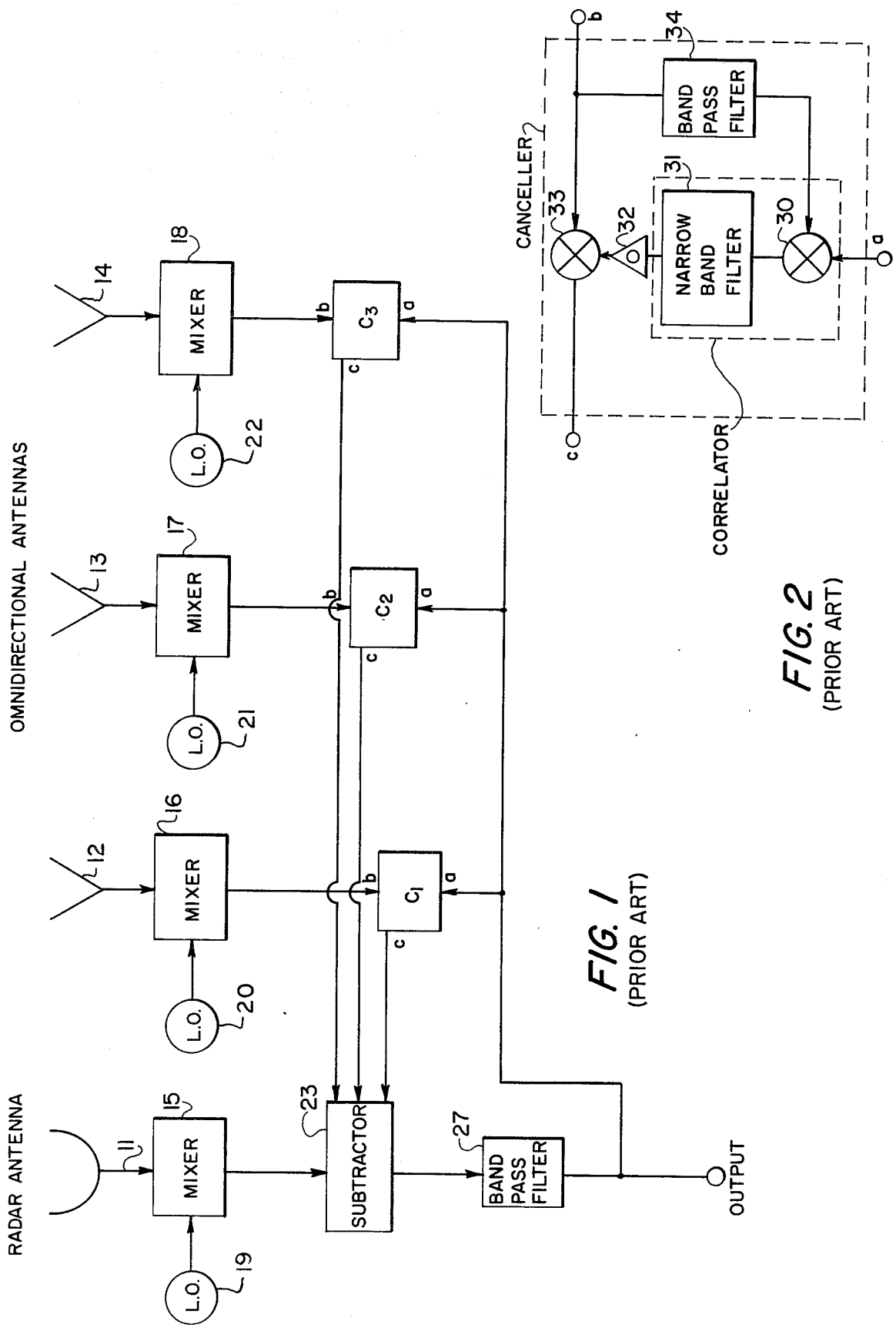

MODIFIED SIDELOBE CANCELLER SYSTEM

CROSS REFERENCE TO RELATED APPLICATIONS

The present invention is related to copending U.S. Application Ser. No. 499,260 entitled "Improved Sidelobe Canceller System" by Bernard L. Lewis and Irwin B. Olin, filed in the United States on an even date herewith and assigned to the same assignee of the present invention.

BACKGROUND OF THE INVENTION

The present invention relates to improvements in signal processing systems and more particularly to improved techniques for eliminating interference introduced into the side-lobes of an antenna from multiple interference sources.

Signal processing equipment in general is designed with a goal of receiving only particular information for evaluation. However, as is often the case, desired information is not isolated by itself but may be found in the presence of unwanted signals. Antenna systems in particular have characteristics that include a main lobe for receiving desired information and a plurality of side-lobes at various angles relative to the main lobe. Due to the nature of an antenna, information received in a side-lobe is indistinguishable from information received in the main lobe and thus renders the antenna highly susceptible to interference from unwanted signals or information. This problem is particularly acute in radar systems where the presence of side-lobes makes it possible for a single noise jammer to be effective against a radar from any angle of azimuth. The problem becomes even more acute when multiple interference or jamming sources are used against a radar and directed from a variety of directions simultaneously.

Side-lobe cancellation is a fundamental approach to eliminating interference in received signals and has been used relatively successfully to eliminate the interference introduced from a single jamming source. Generally, to provide successful cancellation, the side-lobe canceller uses a signal received by an auxiliary omnidirectional antenna to cancel the interference signal received in the side-lobe of the primary antenna. Such a system is taught by U.S. Pat. No. 3,202,990 to Paul W. Howells.

In the case of a plurality of interference or jamming sources, conventional side-lobe canceller systems have not been quite as successful in eliminating interference. As also shown by the patent to Howells, multiple auxiliary antennas distributed in space sample the electromagnetic interference in which the radar is attempting to operate and are combined with the interference in the main radar antenna in a manner designed to subtract the interfering signals. The system according to Howells, however, uses a parallel connection of canceller loops attempting to minimize the correlation between its auxiliary signal and the output of the main channel subtractor. Each canceller, however, can develope only one correlator output that must attenuate and phase shift all components of the auxiliary signal by the same amount. Due to the parallel connection, this can give rise to one canceller introducing signals that must be taken out by another when two or more uncorrelated interference signals are simultaneously received from different directions. This necessity for the cancellers to work against each other requires the canceller loops to have large dynamic ranges that introduce instabilities into the system and limit canceller effectiveness. In practice the instability has been reduced by limiting the gain in each loop, but the total effect is then to limit the amount of cancellation which in turn degrades the overall system performance.

In the copending application to Bernard L. Lewis and Irwin D. Olin previously referred to, it was found that the above noted problem could be reduced by providing independent canceller loops for each auxiliary signal serially arranged to provide a plurality of iterations. However, such a system, in some instances, requires many loops to provide the improved cancellation.

Accordingly, the present invention has been developed to overcome the specific shortcomings of the above known and similar techniques and to provide a device for increasing the cancellation and stability of interference suppression systems.

SUMMARY OF THE INVENTION

It is therefore an object of the present invention to provide an interference suppression system that has all the advantages of similarly employed techniques and none of the disadvantages.

Another object of the invention is to provide a canceller system which requires less dynamic range and lower weighting functions, yet provides improved cancellation.

A further object of the invention is to provide a side-lobe canceller that cascades a plurality of parallel canceller loops to form a series of iterations.

Still another object of the invention is to provide a multiloop canceller system which requires fewer iterations and therefore fewer elements, yet increases the cancellation obtained.

A still further object of the invention is to provide a multiloop side-lobe canceller system which increases the stability of the cancellation system while allowing higher loop gains.

In order to accomplish the above and other objects, the invention provides for a side-lobe cancellation system having a main channel input and a plurality of auxiliary channel inputs for receiving interference from a plurality of noise or jamming sources. Each of the auxiliary channel inputs is connected to supply a signal to a canceller loop in a first group of cancellers the outputs of which are fed in parallel to a subtractor. At the same time, the outputs from the same auxiliary channels are fed to a second group of cancellers in the same manner as the first and forms a second iteration. The input to the subtractor of the second group is the output from the subtractor of the first group. By providing a series of iterations by cascading a plurality of parallel loops, the cancellation of the system can be greatly improved. Since the output from the first group is reduced from the original input signal of the main channel, the loop gains can be made higher without encountering dynamic range limitations. This allows all groups to be constructed to have dynamic ranges allowing stable operation of the first loop while providing increased cancellation in subsequent loops without the danger of oscillation.

Other objects, advantages, and novel features of the invention will become apparent from the following detailed description of the invention when considered with the accompanying drawings wherein:

BRIEF DESCRIPTION OF THE DRAWINGS

FIG. 1 is a block diagram of a prior art parallel canceller system showing the functional relationship between the different elements.

FIG. 2 is a schematic diagram of the electrical circuits forming the cancellers in the diagram of the FIG. 1 and FIG. 3.

DETAILED DESCRIPTION OF PREFERRED EMBODIMENT

Figure 3:
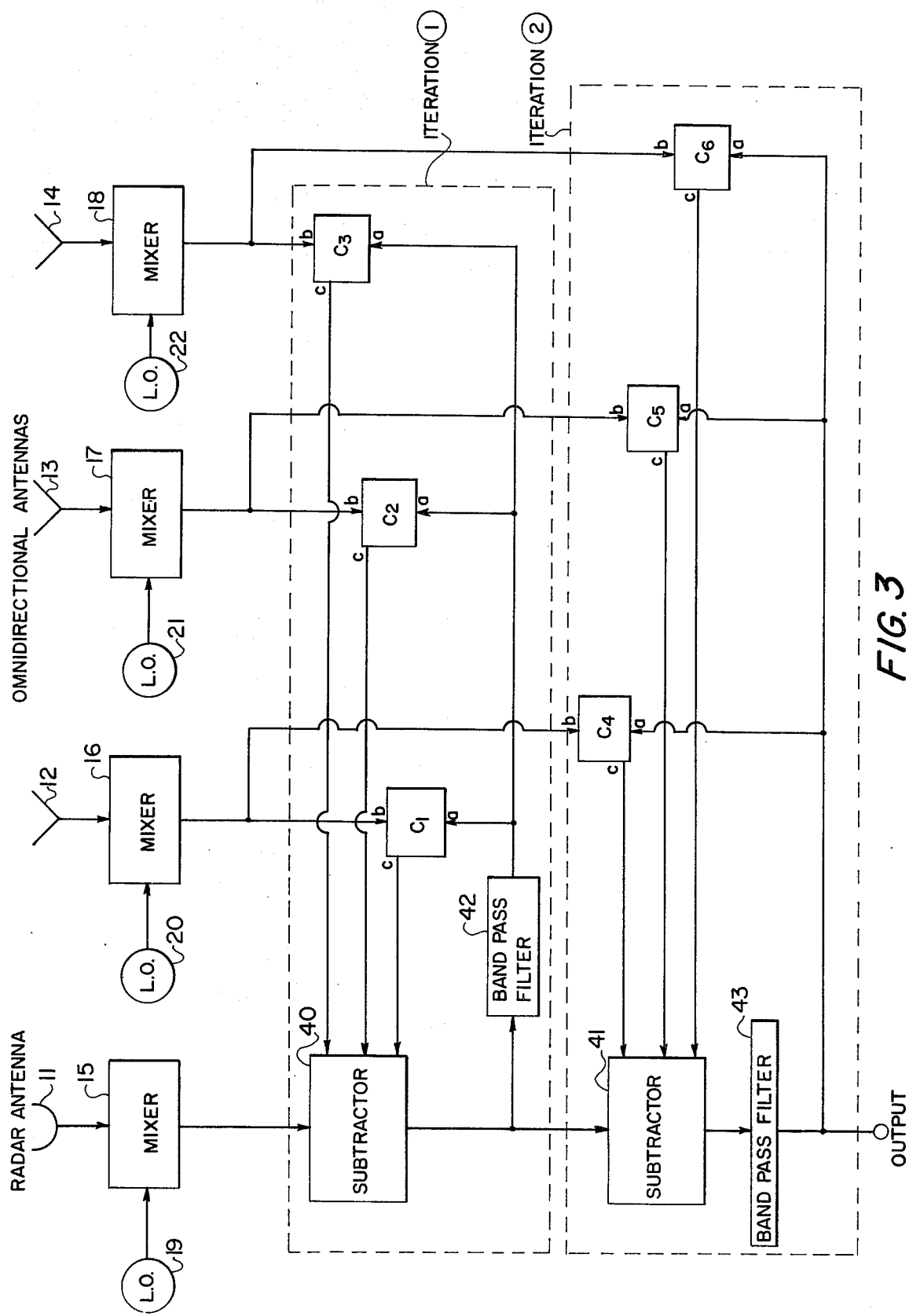
FIG. 3 is a block diagram of the canceller system according to the present invention showing the particular connections necessary for multiple iterations.

Referring to FIG. 1, a conventional multiloop interference suppression system is shown as a side-lobe canceller arrangement in a radar system. The theory behind the operation of this prior art system is generally taught by the patent to Howells U.S. Pat. No. 3,202,990, reference to which is hereby made, and will not be discussed in great detail. Generally, however, the system is comprised of a main receiving channel to the form of a directional radar antenna 11 and a plurality of auxiliary receiving channels designated by omnidirectional antennas 12–14. While only three auxiliary channels are shown, it is usual practice to employ as many auxiliary antennas as there are interference (jamming) sources. The output from the radar antenna 11 is mixed with the output from local oscillator 19 in a conventional mixer or multiplier circuit 15, down to an intermediate frequency (IF). In the same manner, the outputs from auxiliay antennas 12–14 are mixed with the outputs of their respective local oscillators 20–22 in conventional mixing circuits 16–18 respectively, down to an intermediate frequency offset from the frequency of the main channel by an amount at least equal to the main channel signal bandwidth. While the use of separate local oscillators has been described, it is obvious that other techniques of obtaining the desired IF frequency may be employed such as using a single local oscillator for all channels and then offsetting the frequency of the auxiliary channels. The output from mixer 15 in the main channel is then connected through a subtractor circuit 23 and a bandpass filter 27 to an input a of cancellers $C_1$–$C_3$. Likewise, the output from mixers 16–18 in the auxiliary channels, are connected one to each canceller at the inputs b of cancellers $C_1$–$C_3$ respectively. The output c from each canceller is then fed back to the subtractor circuit 23 in the main transmission channel.

FIG. 2 shows the general construction of the canceller circuits $C_1$–$C_3$. Each canceller is identical and is formed from a conventional mixer or multiplier circuit 30 receiving the output from bandpass filter 27 through input a. Input b is divided into two parts with one part passed through bandpass filter 34, having the same time delay as filter 27, and then to a second input to mixer 30. The second part of the auxiliary signal is fed to the input of multiplier or mixer 33. The output of mixer 30 is passed through a narrow band filter 31 and an amplifier 32 to a second input in the mixer 33. The outputs c are then fed in parallel to the input to subtractor 23. While the narrow band filter 31 and amplifier 32 have been shown as separate elements the same could just as well be replaced by a narrow band amplifier for equivalent operation. The operation of the prior art system of FIG. 1 can now be described as follows:

When a plurality of jammers are present, the signal received at the main radar antenna includes a radar signal carrier modulated by the radar signal and having a specified amplitude and phase, and a plurality of jammer carriers having the same frequency but different amplitudes and phases, modulated by the jammer waveforms. The expressions of the jamming signals received in each of the auxiliary antennas is the same as the expressions for the jamming signals in the radar antenna except for a gain difference and a phase shift introduced by the difference in path length from each jammer to each omnidirectional antenna and from each jammer to the radar antenna. The magnitude of the phase shift depends on the position of each jammer and the distance between each auxiliary antenna and the radar antenna.

In order to cancal jamming, the waveform in the auxiliary channels must be properly corrected in phase and amplitude and then combined with the main channel waveform in a manner such that jamming signals cancel and the radar signal does not. To do this, the omnidirectional antenna jamming signals are mixed down to an intermediate frequency in mixers 16–18 respectively and offset in frequency from the intermediate frequency of the radar jamming signal present at the output of mixer 15 as was previously described. Band pass filters 27 and 34 pass carrier signals centered at the intermediate frequencies and modulated by the jammer waveforms. Each of the auxiliary signals are then mixed in a mixer 30, of each of the cancellers $C_1$–$C_3$, with the radar antenna output from band pass filter 27. Mixer 30 and narrow band width 31 generally form a correlator which produces a signal at a frequency difference equal to the difference between the two intermediate frequency imputs to each mixer 30. The amplitude of the signal is proportional to average jammer power in the main channel while the phase is equal to the phase of the jamming signal received at the respective auxiliary antennas with respect to its phase in the radar antenna. The output signal from the amplifiers 32 is a weighting signal that is then used to cancel the phase difference between the main and auxiliary jamming signal in mixer 33. The resultant output is a signal at the radar intermediate frequency that is controlled in amplitude and phase in such manner as to reduce the jamming signal in the main IF channel. Each canceller in the above case attempts to minimize the correlation between the auxiliary signal and the output of the subtractor. However, in doing so, each canceller can only develope one correlator output weight and must attenuate and phase shift all components of its signal by the same amount. Since the cancellers are added in parallel in subtractor circuit 23, there exists the condition of one canceller introducing signals that another canceller must take out when two or more uncorrelated jamming signals are received from different directions simultaneously. That this occurs can be shown by a vector analysis of the interaction between each of the loops for a given set of jammer configuration. For purposes of this invention, it is sufficient to note that such loop opposition requires large dynamic range for calcellation where high loop gain causes instabilities in the system, resulting in ineffective cancellation and limited system performance. As a solution to the problem of instability, the gain of each canceller loop can be limited, but the same results in a limitation on the total cancellation able to be obtained.

Turning now to FIG. 3 a system according to the present invention is shown which substantially reduces the problems of instability caused by the requirement for large dynamic ranges and allows the use of high loop gains for increased cancellation. Like numerals have been used to designate like elements throughout. The system is generally composed of radar antenna 11 forming the main channel for receiving the desired signal as well as interference signals and auxiliary antennas 12–14 forming the auxiliary channels for receiving primarily interference signals. Each antenna output is connected to its respective mixer 15–18 where it is combined with the outputs from local oscillators 19–22 respectively as previously described with reference to FIG. 1. Each of the outputs from auxiliary channel mixers 16–18 are then coupled to a canceller $C_1$–$C_3$ respectively through inputs $b$ also as previously described. Likewise, the outputs $c$ from each of the cancellers are connected in parallel to the input of a subtractor circuit where the output of the main radar channel is combined with the outputs from each of the cancellers. The output from 40 is then connected to each of the cancellers at inputs $a$ through a band pass filter 42 to complete the parallel canceller loops. The band pass filter 42 is equivalent in function to the band pass filter 27 of FIG. 1.

In the present invention, contrary to prior art techniques, the output from subtractor 40 is connected to the input of a second subtractor 41. At the same time the outputs from mixers 16–18 are also connected to the inputs $b$ of a second group of cancellers $C_4$–$C_6$ respectively. Like the first group of cancellers, the outputs $c$ from $C_4$–$C_6$ are connected in parallel and connected as input to subtractor 41 where they are combined with the signal output from the first group of canceller loops from subtractor 40. The output of subtractor 41 is then fed back to each of the cancellers $C_4$–$C_6$ respectively through a band pass filter 43 centered at the main channel IF frequency to complete the canceller loops of the second group. Each group of cancellers connected in parallel is called an iteration, and although only two iterations are shown in the drawing, it is contemplated that as many could be serially connected as required for the particular application. Each group utilizes the output of the previous subtractor and connects the outputs of all cancellers in parallel until all auxiliary channel cancellers have been utilized at which time a successive group of cancellers using the same auxiliary signals are connected in parallel in the same manner as the previous group until all auxiliary signals have been used. The final output is then taken through a band pass filter 43.

In the operation of the circuit according to the present invention, each canceller obtains a sample of the radar jamming environment from its own auxiliary antenna and attempts to minimize the correlation between its auxiliary signal and the subtractor output as has been previously described. Normally, as was noted, this can cause the cancellers to oppose one another and force the loops to operate with large weighting functions which can lead to instability and increases in the required dynamic range in each loop. This condition requires that the loop gain be decreased to maintain stability and results in a corresponding decrease in the cancellation ratio, defined as the ratio of input to output jamming power in the main channel.

In the present invention, however, a second group of canceller loops designated as an iteration, is serially connected to operate on the residue of the first group of cancellers. The second group of cancellers operates in the same manner as the first except that the input signal from the main channel is the residue output from the first iterative group. Since this output is the result of the operation by the first iteration, it will be of a reduced value. In the same way, any subsequent output of any iteration will be less than its input value. Since the added groups will have a smaller input, and thus smaller input into the canceller loops, the loop gains can be made higher without encountering dynamic range limitation. This means that the initial loops of the first iteration can be reduced in gain to operate at a stable dynamic range and allow successive iterations to provide the necessary cancellation for the residue output of the first iteration. The effect is to get equal or better cancellation than could be obtained even if the necessary dynamic range and gains of a conventional single iteration parallel loop canceller could practically be realized.

As can be seen from the above description, the present invention provides an improved technique for increasing the ability of a side-lobe canceller system to eliminate interference in the main signal channel. Using a plurality of serially connected canceller groups forming a plurality of iterations, the output interference signal is continually reduced with stable loop operation. Contrary to prior art techniques, where cancellation was limited by dynamic range considerations, cancellation according to the present invention is only limited by the number of iterations employed. Since the canceller loops are constructed from relatively simple circuit elements, the structure lends itself well to construction using integrated circuit techniques that substantially reduce the cost for a greater number of iterations. In comparison to the system of the previously mentioned application of Bernard L. Lewis and Irwin D. Olin, the present invention provides increased cancellation with a smaller number of iterations.

While the invention has been described with particular reference to a radar system, the teachings are equally applicable to many other signal processing systems such as sonar, etc... In addition, while the description referred to only three auxiliary channels it is obvious that the same principles can be applied for any number of auxiliary channels. Further, although the invention has been described with particular reference to an IF receiving system and specific canceller construction, the inventive teachings are equally applicable to any signal cancelling system using adaptive canceller loops of any appropriate construction.

Obviously many other modifications and variations of the present invention are possible in light of the above teachings. It is therefore to be understood that within the scope of the appended claims the invention may be practiced otherwise than as specifically described.

What is claimed and desired to be secured by Letters patent of the United States is:

1. An interference cancellation system comprising:
   a main channel means for receiving desired signals and interference signals and forming a main channel signal;
   a plurality of auxiliary channel means for receiving primarily interference signals and forming auxiliary channel signals;
   first means for reducing interference in the main channel signal comprising, a plurality of canceller means with each one coupled to receive said main channel signal and a different auxiliary channel signal for comparing the main channel interference signal and its respective auxiliary channel signal and providing a first cancelling signal therefrom and a first subtractor means coupled to said canceller means and said main channel means for combining the first cancelling signal from all of said canceller means in parallel and subtracting said first cancelling signals from the main channel signal to form a reduced interference main signal output, each of said canceller means being connected to receive the output of the first subtractor means as the main channel interference signal; and at least one iterative means for reducing interference in the main signal output from said first means comprising, a plurality of second canceller means with each one coupled to receive said main channel signal and a different auxiliary channel signal for comparing the main channel interference signal and its respective auxiliary signal and providing a second cancelling signal therefrom and a second subtractor means coupled to said second canceller means and said first subtractor means for combining the second cancelling signal from all of said canceller means in parallel and subtracting said second cancelling signals from the main signal output to form a main signal output of further reduced interference, each of said second canceller means being connected to receive the output of said second subtractor means as the main channel interference signal.

2. The system of claim 1 wherein said at least one iterative means comprises a plurality of iterative means serially connected such that the main signal output of the previous iterative means is connected as input to the next succeeding iterative means to successively reduce interference in the main signal output.

3. The system of claim 2 wherein said main channel means comprises a directional antenna for providing the main channel signal and wherein each of said auxiliary channel means comprises an auxiliary antenna for providing the auxiliary channel signals.

4. The system of claim 3 wherein each of said auxiliary antennas is an omnidirectional antenna.

5. The system of claim 1 wherein the plurality of canceller means of said iterative means are coupled to receive the same auxiliary channel signals as those received by the plurality of canceller means of said first means.

* * * * *